July 17, 1956 — P. D. BECKER — 2,754,717
RESILIENT, THREADLESS SHEET METAL FASTENER
FOR USE WITH THREADLESS STUDS
Filed Feb. 11, 1953
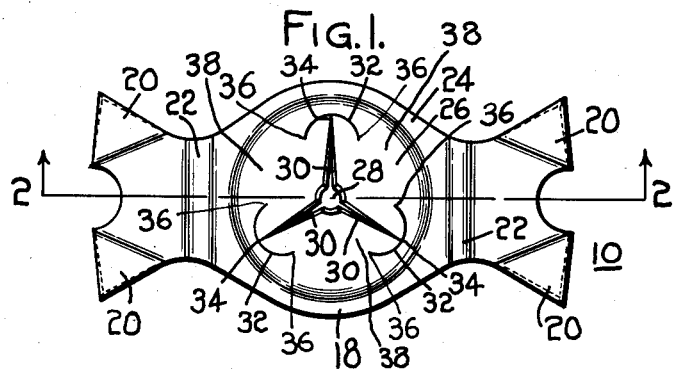
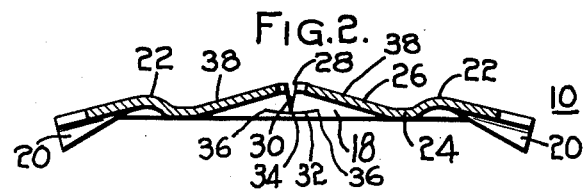
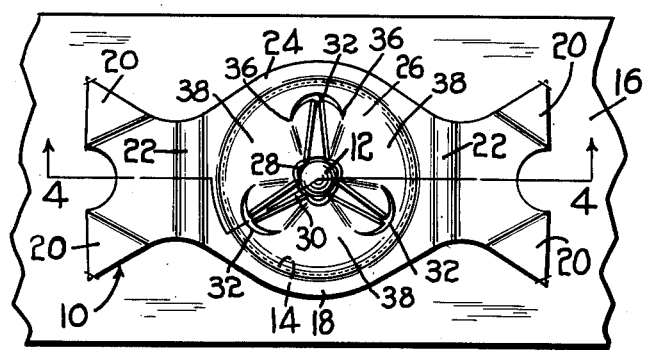
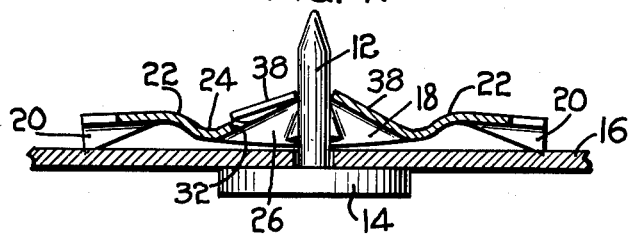
INVENTOR:
PHILIP D. BECKER,
BY Robert E. Ross
ATTORNEY.

United States Patent Office
2,754,717
Patented July 17, 1956

2,754,717

RESILIENT, THREADLESS SHEET METAL FASTENER FOR USE WITH THREADLESS STUDS

Philip D. Becker, Hingham, Mass., assignor, by mesne assignments, to United-Carr Fastener Corporation, Boston, Mass., a corporation of Delaware Application February 11, 1953, Serial No. 336,330

1 Claim. (Cl. 85—36)

This invention relates generally to fastening devices, and has particular reference to a sheet metal fastener of the type adapted to engage a smooth unthreaded stud.

Fasteners of this general type are commonly provided with two or more inclined legs, having ends for biting into the surface of the stud. The legs are designed to flex upwardly when the fastener is assembled onto the stud so that they are retained in the inclined flexed condition for tight engagement with the surface of the stud.

Such devices are commonly used to retain some device such as a name plate or an ornamental plate onto a panel. The plate is provided with protruding studs for entering apertures in the panel and the fasteners are assembled onto the stud on the opposite side of the panel.

Although such fasteners are economical to manufacture and are easily and rapidly assembled, they have had a number of disadvantages which have prevented their use in many applications.

For example, if the stud is chromium plate, the fastener must have extremely hard ends on the biting legs and the legs must be stiff enough to bite through the chromium plate, otherwise vibration can cause the fastener to back off the stud.

Although the fastener can be provided with these characteristics by forming it of high carbon steel with a suitable heat treatment, such fasteners present a further problem in that they frequently break during assembly. For this reason, fasteners of this type must be designed for a particular size and shape of stud, and fasteners of any particular size are not adaptable to any substantial variation in stud size or shape.

Another disadvantage of fasteners of this type is that it is possible for the stud to enter the fastener in an incorrect manner, that is, the stud, in some cases, enters between the sides of the legs rather than between the ends of the legs. When so assembled, the fastener is frequently broken, or has poor holding power.

The object of this invention is to provide a sheet metal fastener which is adapted for use on studs of various sizes and shapes.

A further object of the invention is to provide a fastener of this type in which means is provided to prevent breaking of the stud-engaging legs during assembly.

A still further object of the invention is to provide a fastener of this type which cannot be improperly assembled onto a stud.

In the drawing:

Fig. 1 is a top plan view of a fastening device embodying the features of the invention;

Fig. 2 is a view in section taken on line 2—2 of Fig. 1;

Fig. 3 is a top plan view of the fastening device of Fig. 1 assembled onto a stud protruding through a panel opening;

Fig. 4 is a view in section taken on line 4—4 of Fig. 3.

Referring to the drawing, there is illustrated a fastening device 10, which is adapted for assembly onto an unthreaded stud 12 to retain an article 14 in assembly with a panel 16.

The stud 12 may either be integral with the article 12, which may be a name plate or an ornamental plate, or may be otherwise secured thereto in any convenient manner.

The fastener 10 is preferably formed of a single piece of hardened high carbon sheet steel, and comprises generally a medial portion 18 and a pair of panel bearing portions 20 extending from opposite ends of the medial portion. The panel bearing portions 20, in the preferred embodiment, are provided with transverse upwardly rounded portions 22. This feature is described and claimed in my co-pending application, Serial No. 174,437, filed July 18, 1950 and now abandoned, and assigned to the same assignee as the present application.

The medial portion 18 comprises generally a substantially flat outer periphery 24 and a central upwardly extending portion 26 which is generally concave in shape. The central portion 26 is provided with an aperture 28 and a series of radial slits 30 extending from the aperture toward the periphery 24 and terminating in spaced relation thereto. At the outermost end of each slit 30 is disposed a semi-circular slit 32, which is joined at its medial or outermost portion 34 to the end of the corresponding radial slit. The ends 36 of the semi-circular slits extend away from the adjacent portion of the peripheral portion in spaced relation to the corresponding radial slits.

The slits 30 and 32 and the aperture 28 form a series of upwardly inclined legs 38 for gripping the stud 12 when the fastener is assembled thereon.

The fastener is assembled by simply forcing it onto the stud, so that the legs 38 flex upwardly enlarging the central opening to allow the stud to pass therethrough. The fastener is forced down on the stud until the flat periphery 24 seats against the panel 16, thereby flexing the panel bearing portions 20. When the force driving the fastener onto the stud is released, the portions 20 tend to lift the fastener off the stud, causing the legs to dig more tightly into engagement with the stud.

The legs 38 must flex a considerable amount to permit assembly onto a stud of any substantial size. The provision of the semi-circular slits prevents breaking of the legs during the flexing by directing stresses at the ends of the slits away from the periphery rather than toward the periphery, as would be the case if no semi-circular slits were present.

As illustrated in Fig. 1, before assembly the only aperture is at the exact center of the medial portion with substantially no gaps existing between the legs at the outer ends thereof; hence, during assembly, the stud can enter the fastener only at the correct position. This feature is of great importance when the fastener is assembled onto pointed studs in the manufacture of automobiles or appliances on assembly lines, where the fasteners must be assembled rapidly. Similarly, as shown in the drawings, each slit 32 has its opposite side edges in contact with one another at its ends and substantially in contact with one another throughout its length.

Since certain obvious changes may be made in the device without departing from the scope of the invention, it is intended that all matter contained herein be interpreted in an illustrative and not in a limiting sense.

I claim:

A fastening device for assembly onto a stud to seat against a panel, said fastener being formed of a single piece of resilient sheet metal and comprising a medial portion having a substantially flat periphery, resilient panel bearing portions extending from opposite sides of the medial portion and having downwardly extending end portions, said medial portion having a series of radial slits extending from a small central aperture formed therein and terminating in spaced relation to the periphery of the medial portion, said slits forming a plurality of leg portions having their side edges in contact with one another adjacent the ends remote from the central aperture, and a semi-circular slit disposed at the outermost end of each radial slit, each semi-circular slit having its opposite edges in contact with one another at its ends and substantially in contact with one another throughout its length, the ends of each semi-circular slit extending away from the adjacent periphery of the medial portion, each radial slit joining the corresponding semi-circular slit at the outermost portion of the semi-circular slit.

References Cited in the file of this patent

UNITED STATES PATENTS

| | | |
|---|---|---|
| 913,024 | Meacham | Feb. 23, 1909 |
| 1,037,010 | Irons | Aug. 27, 1912 |
| 2,047,298 | Tinnerman | July 14, 1936 |
| 2,492,115 | Crowther | Dec. 20, 1949 |

FOREIGN PATENTS

| | | |
|---|---|---|
| 9,432 | France | Oct. 29, 1909 |
| 566,073 | Great Britain | Dec. 12, 1944 |